Sept. 29, 1964      R. H. PINTELL      3,151,287

CONTROLLED DIRECT-CURRENT GENERATOR

Filed May 12, 1960

ROBERT H. PINTELL
INVENTOR.

BY
*Karl F. Ross*
AGENT

United States Patent Office 3,151,287
Patented Sept. 29, 1964

3,151,287
CONTROLLED DIRECT-CURRENT GENERATOR
Robert H. Pintell, Bronx, N.Y., assignor to Intron International, Inc., New York, N.Y., a corporation of New York
Filed May 12, 1960, Ser. No. 28,592
18 Claims. (Cl. 321—45)

My present invention relates to a controlled generator of direct current in which the output of a direct-current source is additively or subtractively combined with the rectified output of an alternating-current source as disclosed in my co-pending application Ser. No. 738,538, filed 28 May 1958, of which the preesnt application is a continuation-in-part.

Heretofore, the windings of saturable-core transformers were generally maintained isolated from all direct-current sources, except in certain cases such as that of a second-harmonic magnetic amplifier using two balanced cores, in order to prevent partial or complete saturation of the core by the flow of a biasing current which would tend to distort the output of the transformer. This difficulty can now be avoided by a circuit arrangement first disclosed in my above-mentioned co-pending application in which a regulated direct-current generator of this type comprises an oscillator of great frequency stability, including a saturable-core transformer, whose rectified output is combined with a direct current from a suitable source also serving for the energization of the oscillator.

It is an object of my present invention to extend this principle to other direct-current generators using saturable-core transformers.

It is another object of the invention to provide means for connecting the output of a saturable-core device in series with a source of direct current without saturating the core.

It is a further object of the invention particularly disclosed in this and in my co-pending application to provide an improved auto-transformer system for direct current.

According to a feature of this invention, the output winding of a saturable-core device is split into two preferably equal portions both connected in series with a load and a source of direct current, e.g. a battery or other energy source which supplies the driving current to the primary winding of the saturable-core transformer. Each portion of the output winding is connected in series with rectifying means so that the direct biasing current is split between the two winding portions with the same number of ampere-turns in each direction whereby the two biasing currents exactly balance each other. Advantageously, the oscillator comprises two electronic switching devices (e.g. crystal amplifiers) connected in push-pull across an exciter winding on the saturable core; an unbalanced primary circuit may, however, also be used.

I have found that a saturable-core transformer employed in a direct-current autotransformer in the aforedescribed manner requires a considerably less massive core than do similar devices in conventional circuits, it being no longer necessary to attenuate the undesirable direct-current bias inevitable in prior systems.

The above and other objects, features and advantages of the present invention will become more readily apparent from the following description, reference being made to the accompanying drawing in which.

Figure 1:
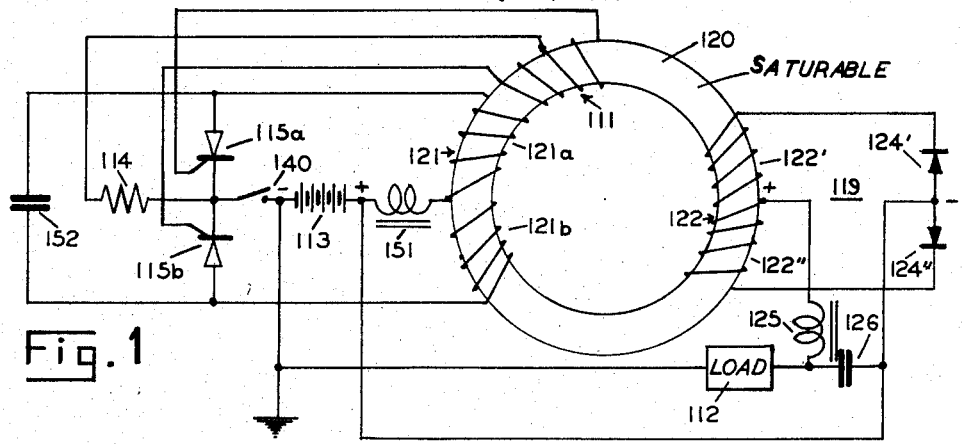
FIG. 1 is a circuit diagram of a direct-current autotransformer according to the invention.

In FIG. 1 of the drawing I show a simplified D.-C. autotransformer circuit wherein the grounded negative terminal of a battery 113 is connected to the back-to-back cathodes of a pair of solid-state controlled rectifiers (thyratrons) 115a and 115b via a starting switch 140. The anodes of the controlled rectifiers 115a, 115b, connected in push-pull, are tied to respective halves 121a, 121b of the split primary winding 121 of a toroidal saturable-core transformer 120. The center tap of primary winding 121 is returned to the positive pole of the battery. Transformer 120 is provided with a feedback secondary winding 111 whose outermost terminals are connected, respectively, to the gates of controlled rectifiers 115a, 115b and whose center tap is connected in series with a biasing resistor 114 to the negative pole of battery 113. The positive terminal of battery 113 is tied to the negative pole of a full-wave rectification network 119 which comprises a pair of back-to-back rectifiers 124' and 124", e.g. in the form of crystal diodes, each connected to a respective extremity of an output secondary winding 122 of the saturable-core transformer 120. The center tap between the two halves 122', 122" of the split winding 122 constitutes the positive pole of the rectification network 119 and is connected, via a smoothing choke 125, to a load 112 which is returned to ground. The output filter also includes a condenser 126 bridged across the positive and negative terminals of the rectification network 119. A ballast choke 151 is inserted in series with battery 113 between its positive terminal and the center tap of primary winding 151, a commutating condenser 152 being bridged across the discharge devices 115a, 115b.

Figure 3:
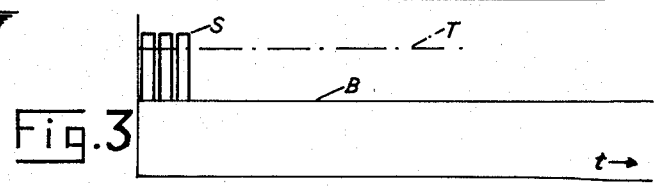
FIG. 3 is a graph illustrating the current flow in the output circuit of the embodiment shown in FIG. 1.

In operation, switch 140 is closed to set the primary circuit of transformer 120 into oscillations at a frequency determined by the saturation rate of its saturable core, e.g. at several kilocycles per second with selection of a core material having a suitable hysteresis loop. Controlled rectifiers 115a and 115b are alternately rendered conductive to switch current from the battery 113 through the respective halves 121a and 121b of primary winding 121 in response to the excitation current delivered to the gates of the rectifiers 115a, 115b from the feedback winding 111. The fully rectified square-wave output of the secondary winding 122 is additively combined with the direct current from battery 113 flowing through the rectification network 119, the resultant current being filtered by means of choke 125 and condenser 126 to produce a substantially ripple-free current through the load 112. In FIG. 3, the battery current is shown at B, the rectified square-wave current is denoted by the reference character S and the filtered resultant current is designated T, the latter being, of course, the integrated value of the rectified square-wave output algebraically added to the battery current.

Since only one half of the battery current passes through each rectifier 124', 124", direct current flows in opposite directions through the respective halves 122', 122" of secondary winding 122; thus there is always a complete balance between the saturating tendencies of the current flow in the two branches of the output circuit. Since no unbalanced flow of direct current occurs in any of the saturable-core windings, D.-C. saturation of the core is entirely obviated; this permits the use of lightweight toroidal cores (e.g. of nickel-iron) in place of the massive air-gap transformers which otherwise would be required.

Figure 2:
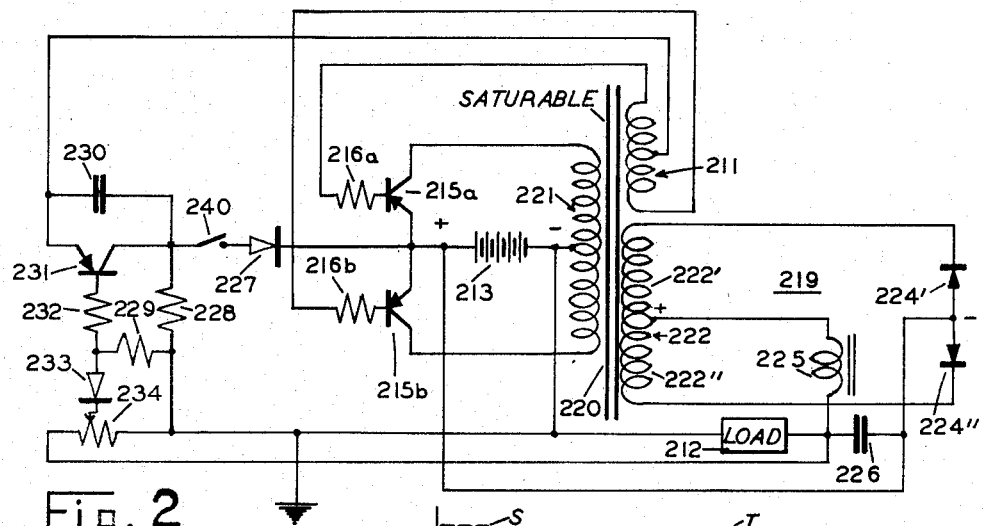
FIG. 2 is a circuit diagram of a modified autotransformer embodying the invention.

In FIG. 2 I show a D.-C. autotransformer provided with a regulator adapted to reduce the drive of the oscillator input in response to a rise in the output current or voltage above a predetermined limit. The ungrounded positive terminal of a battery 213 is tied to the negative terminal of a rectification network 219 which includes the secondary 222 of a saturable-core transformer 220 and feeds the load 212, in parallel with a potentiometer 234, through a smoothing filter including a choke 225 and a condenser 226. The load circuit again includes a pair of rectifiers 224′, 224″ connected back-to-back in series with respective portions 222′, 222″ of output winding 222.

A pair of P-N-P transistors 15a and 215b have their emitter-collector circuits connected in push-pull across respective halves of the primary winding 221 of the saturable-core transformer 220 in series with the battery 213. The emitter-collector path of an auxiliary transistor 231, which is shunted by a condenser 230, is connected in series with a rectifier 227 to the positive terminal of battery 213 and to the center tap of a secondary winding 211 of transformer 220; the outer limbs of the latter winding are returned to the bases of the oscillator transistors 215a, 215b via series resistances 216a, 216b, respectively. The collector of transistor 231 is grounded through a resistor 228. The base of this transistor is connected through series resistor 232 and a Zener diode 233 to the slider of potentiometer 234.

In operation, the oscillator transistors 215a, 215b will, upon closure of switch 240, generate an alternating current in the secondary winding 222 which is rectified, filtered and additively combined with the direct battery current to produce an increased D.-C. output as previously described. When the voltage across the load 212 becomes excessive, the base of transistor 231 will be biased more positively by the control current flowing through diode 233 (which is so poled as normally to block the flow of direct current through it), thereby limiting the amplitude of the oscillating current. Thus, the transistor 231 and its associated circuit element may be regarded as a variable impedance, replacing resistor 114 of FIG. 1, whose resistance rises sharply in response to a control voltage which is produced by the load circuit when the current therein exceeds a predetermined limit.

It will be apparent that the output of transformers 120 and 220 could also be connected to the batteries 113 and 213 in bucking rather than aiding relationship if, for any reason, it should be desirable to have an output voltage which is lower than that of the battery.

Figure 4:
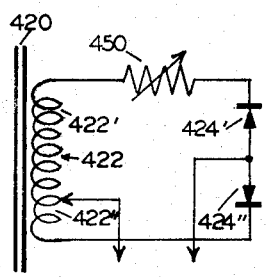
FIG. 4 shows a modification of the output circuit of a transformer as shown in FIG. 1 or 2.

FIG. 4 shows the output winding 422 of a saturable-core transformer 420, forming part of a D.-C. autotransformer, split into two unequal portions 422′, 422″ respectively in series with the back-to-back rectifiers 424′, 424″. An adjustable compensating resistor 450 is shown connected in series with the winding portion 422′ having the larger number of ampere-turns, this resistor thus serving to insure equal current flow through the two rectifiers. The adjustability of resistor 450 and of the tap on winding 422 enables the output current to be varied. The remainder of the circuit arrangement, not shown, may be similar to that illustrated in FIG. 1 or 2.

Figure 5:
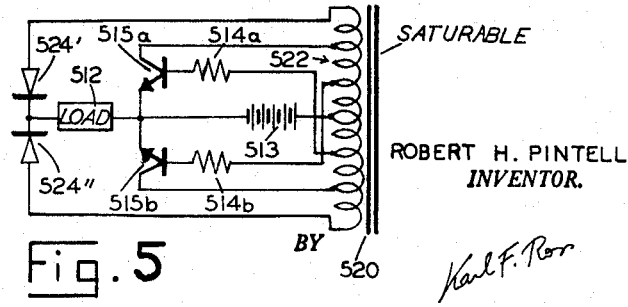
FIG. 5 is a circuit diagram representing a further embodiment.

FIG. 5 illustrates an A.-C. autotransformer 520 having a single winding 522 serving the functions of the input, feedback and output windings of the transformers previously described. The rectifiers 524′, 524″ are connected back-to-back across the extremities of winding 522, their junction being connected through load 512 to the common emitter terminal of two N-P-N transistors 515a, 515b and thence via battery 513 to the center tap of the winding. The collectors of the transistors are connected directly to intermediate points of the respective winding halves while their bases are cross-connected, via limiting resistors 514a, 514b, to taps on the opposite winding halves. The overall system operates as a D.-C. autotransformer in a manner analogous to that of the circuit arrangement of FIG. 1.

The invention as described and illustrated is believed to admit of many variations and modifications which should be readily apparent to persons skilled in the art and are intended to be embraced within the spirit and scope of the invention as defined in the appended claims.

I claim:

1. A circuit arrangement for combining the rectified output of an alternating-current generator with the output of a direct-current source, said generator including a saturable-core transformer provided with an output winding having an intermediate tap, which comprises a first and a second branch circuit including respective portions of said winding on opposite sides of said tap and rectifier means in series with said portions, and a low-resistance circuit including said direct-current source connected in series with a load across both said branch circuits in parallel, said rectifier means being so poled and the impedances in said branch circuits being so dimensioned that substantially equal ampere-turns of load current pass through said portions in opposite directions.

2. A circuit arrangement according to claim 1, further comprising a smoothing network connected across the series combination of said direct-current source with said load.

3. A circuit arrangement for combining the rectified output of an alternating-current generator with the output of a direct-current source, said generator including a saturable-core transformer provided with an output winding, which comprises a pair of rectifiers connected back-to-back across the extremities of said winding and a low-resistance circuit including said direct-current source connected in series with a load between an intermediate tap on said winding and the junction of said rectifiers, said tap being so located that substantially equal ampere-turns of load current pass through said winding on opposite sides of said tap.

4. A circuit arrangement according to claim 3, further comprising a smoothing network connected between said tap and said junction.

5. A direct-current generator comprising an oscillator provided with a saturable-core transformer, said transformer being provided with an output winding having an intermediate tap, a first and a second branch circuit including respective portions of said winding on opposite sides of said tap and rectifier means in series with said portions, and a low-resistance circuit including a source of direct current connected in series with a load across both said branch circuits in parallel, said rectifier means being so poled and the impedances in said branch circuits being so dimensioned that substantially equal ampere-turns of load current pass through said portions in opposite directions.

6. A generator according to claim 5 wherein said oscillator includes a primary winding on said transformer and a switching circuit connected across said primary winding, said switching circuit being provided with a variable impedance responsive to a control voltage, further comprising a shunt resistance connected across said load for developing said control voltage upon being traversed by the rectified current, said variable impedance having input means connected to said shunt resistance for reducing the flow of current in said switching circuit upon an increase in the magnitude of said rectified current.

7. A generator according to claim 6 wherein said input means includes an electronic breakdown device blocking the passage of current from said shunt resistance to said variable impedance until the magnitude of said rectified current exceeds a predetermined limit.

8. A generator according to claim 7 wherein said breakdown device is a Zener diode.

9. A generator according to claim 8 wherein said variable impedance comprises a transistor having said Zener diode connected between its base and its collector.

10. A generator according to claim 6 wherein said switching circuit serially includes said source of direct current.

11. A direct-current autotransformer comprising an oscillator provided with a saturable-core transformer, said transformer being provided with an input winding, a feedback winding and an output winding, electronic switching means and a source of direct current serially connected across said input winding, said switching means having an input connected across said feedback winding for periodic opening and closing at a frequency determined by the saturation rate of the transformer core, a pair of rectifiers connected back-to-back across the extremities of said output winding, and a low-resistance circuit including said source connected in series with a load between an intermediate tap on said output winding and the junction of said rectifiers, said tap being so located that substantially equal ampere-turns of load current pass through said output winding at opposite sides of said tap.

12. An autotransformer according to claim 11, further comprising a control resistance connected across said load, and amplifier means in series with said switching means, said amplifier means having an input connection across said control resistance for reducing the flow of current through said switching means upon an increase in the magnitude of the load current.

13. An autotransformer according to claim 12 wherein said input connection includes an electronic breakdown device normally isolating said amplifier means from said control resistance until the magnitude of the load current exceeds a predetermined limit.

14. An autotransformer according to claim 13 wherein said amplifier means comprises a transistor, said breakdown device being a Zener diode.

15. An autotransformer according to claim 11 wherein said switching means comprises a pair of electronic discharge devices connected in push-pull across respective halves of said input winding.

16. An autotransformer according to claim 15 wherein said discharge devices are crystal amplifiers.

17. A direct-current autotransformer comprising a saturable magnetic core, winding means on said core, electronic switching means and a source of direct current serially connected across a first portion of said winding means, said switching means having an input connected across a second portion of said winding means for periodic opening and closing at a frequency determined by the saturation rate of said core, a pair of rectifiers connected back-to-back across a third portion of said winding means, and a low-resistance circuit including said source connected between an intermediate tap on said third portion and the junction of said rectifiers in series with a load, said tap being so located that substantially equal ampere-turns of load current pass through said third portion at opposite sides of said tap.

18. An autotransformer according to claim 17 wherein at least said first and third portions constitute overlapping sections of a single winding.

References Cited in the file of this patent
UNITED STATES PATENTS

| | | |
|---|---|---|
| 2,848,614 | Lyons | Aug. 19, 1958 |
| 2,950,446 | Humez et al. | Aug. 23, 1960 |
| 3,015,771 | Mesenhimer | Jan. 2, 1962 |